Patented Apr. 21, 1925.

1,534,387

UNITED STATES PATENT OFFICE.

FRANK M. HILDEBRANDT AND CHARLES N. FREY, OF PITTSBURGH, PENNSYLVANIA, ASSIGNORS, BY MESNE ASSIGNMENTS, TO THE FLEISCHMANN COMPANY, A CORPORATION OF OHIO.

METHOD OF TREATING AND PREPARING YEAST.

No Drawing.   Application filed January 5, 1921. Serial No. 435,237.

*To all whom it may concern:*

Be it known that we, FRANK M. HILDEBRANDT and CHARLES N. FREY, both citizens of the United States, residing, respectively, in Pittsburgh, county of Allegheny, and State of Pennsylvania, have invented certain new and useful Improvements in a Method of Treating and Preparing Yeast, of which the following is a specification.

This invention relates to a method for treating yeast by which the baking strength and fermenting power of the yeast will be increased and which also enables it to be preserved without the loss of these or other properties; and has as its object the carrying out of such treatment in a rapid, economical and efficient manner.

The yeast which is to be treated by the method of our invention may be initially produced by any process of manufacture that is preferred, the method being particularly applicable to bakers' yeast.

Heretofore, after such yeast has been propagated, it has been separated from the spent wort by centrifuging, filtering, pressing, etc., in the well-known way. The yeast thus obtained, after pressing, still retains therefore a considerable amount of water, for example, up to even 65 or 70% by weight. We have found that this yeast, as marketed, is not in the best possible condition; the first step of our method accordingly relates to a treatment for such yeast which will improve its baking strength, fermenting power, keeping qualities, etc.

As an example of the manner in which this step is carried out, the following is given:

The yeast is subjected to slow aeration for an extended period of time in a solution which we term a "conditioning solution" and is characterized by the presence of a large amount of carbo-hydrate, for example, sugar, and a small amount of material containing yeast assimilable nitrogen, relative to the amount of yeast to be treated. The result of this treatment is to effect a conditioning or ripening of the yeast in such a way as to prevent any considerable multiplication of the cells, as would occur, for example, in case there was an abundant supply of yeast assimilable nitrogen together with an abundance of carbohydrate material.

Any one of several substances containing yeast assimilable nitrogen may be employed; at present we prefer to use an organic salt of ammonium; for example, ammonium tartrate, since in the use of this, the acid released is not considered to be toxic to the yeast. Moreover we have found that good results may be obtained by supplying in addition a small amount of a substance containing yeast assimilable phosphorous; for example, calcium phosphate. Since small amounts of yeast assimilable nitrogen and phosphorous compounds in yeast nutrient solutions are helpful in assisting the yeast in the utilization of the sugar material present, the use of such compounds may be employed to effect control of the cell modification which is desired. Also, by using only such small amounts, vigorous and extensive growth of the new yeast cells is limited and substantially prevented, while at the same time the conditioning of the cells already present is accomplished.

In order to insure the yeast against infection, it is desirable to have a slight initial acidity in the liquid. This acidity should be preferably of a character harmless to the yeast and we use, for example, a small quantity of lactic acid for accomplishing this purpose.

As a specific example of the materials used to make a conditioning solution in accordance with the practice of our invention the following is given:

| | |
|---|---|
| Yeast (as ordinarily made and marketed) | 100 lbs. |
| Sugar | 40 to 100 lbs. |
| Water | 200 gallons. |
| Ammonium tartrate | 1 to 3 lbs. |
| Calcium phosphate | ½ to 2 lbs. |
| Lactic acid | ½ lb. |

The amounts of the various components may of course be varied within certain limits; we have found, for example, that the sugar content may be varied approximately from 2 to 5%. Aeration is continued until the desired activity of the yeast is terminated or until the sugar is substantially exhausted, the duration of course varying, but generally extending from 3 to 10 hours.

After the period for the conditioning treatment is completed, the yeast is separated from the liquid; the usual method of centrifuging and pressing being adapted to this end. A yeast product, if marketed after such a conditioning treatment, would be of a character superior to that of the ordinary yeast of commerce, having greater baking strength, fermenting power and keeping qualities.

In order, however, to enable such a treated product to retain these qualities practically indefinitely, we preferably subject the yeast to the following further treatment:

Yeast, treated as above, is subjected to conditions which are more or less analogous to those which induce micro-organisms to enter upon their resting stages. This we accomplish by reducing the temperature of the yeast to a point equal to or below the freezing point of water, for example, minus 4° C. The duration of this refrigerating step depends upon various conditions such as the size or sizes of the mass or masses used. If these are relatively small so that the escape of heat therefrom occurs within a short time, the period of exposure need not be more than 5 to 10 hours. When the masses are larger, it may be continued for as long as 30 hours. The period of refrigeration should be continued until the masses have substantially congealed.

Much of the water content of the mass, as a result of such congelation, is driven out, forming crystals of ice. The yeast cells in consequence are partially dehydrated but, as subsequent experience demonstrates, are not injured as regards to their powers of propagation, baking strength, fermenting power, etc.

After the refrigerating period has been completed the mass is brought back, preferably slowly, to normal temperature, whereupon the congealed fluid melts; the water, though, which has been exuded during refrigeration, is not appreciably reappropriated by the cells.

The mass thus thawed is then mixed with a suitable quantity of a granular or pulverulent absorbent material, preferably a food material, such, for example, as corn meal, the distribution of the absorbent material within the mass being made as homogeneous as possible. We have found that the proper proportion of materials will, as a rule, be between 30 to 70 lbs. of corn meal to each 100 lbs. of yeast. The absorbent material not only absorbs such moisture as may be present in the neighborhood of the yeast particles, but also serves to separate the particles of yeast from each other and to maintain them in such separated relation.

When the thawed yeast and the absorbent material have been thoroughly mixed, we next subject the mass to a drying operation which may be carried out in any suitable manner; for example, the mixture may be spread upon a stationary support and currents of properly tempered air passed over it until the water has been withdrawn to the desired extent. After this step of dehydration, the meal or absorbent material further acts to prevent moisture from passing into the cells and to maintain the cells in their dormant condition. Water, however, finds free access to every portion of the treated mass, when it is desired to soak it preparatory to use, due probably to the generally porous character of the coating thus provided for the yeast cells.

In order still further to insure against injury to the cells from moisture, we add another component to the mass. This component is added after the meal has been mixed with the yeast but before any desiccating or dehydrating action, and comprises a suitable amount of oil, such as refined mineral oil. This step of mixing together the mass and oil is carried on until the oil is distributed uniformly throughout the mass, the aim being to have each cell or each small cluster of cells thoroughly filmed with oil. We have found that an amount of oil which may be used with good results is 7 lbs. to each 100 lbs. of yeast. When oil is used in this manner, a small amount of water is preferably introduced and thoroughly mixed with the mass until complete homogeneity is reached.

As a final step, the paste-like mass is again desiccated at a low temperature preferably in the manner above described.

Having described our invention, what we claim as new, and desire to secure by Letters Patent is:

1. The method of treating yeast subsequent to propagation for enabling it better to retain its baking properties, which comprises causing a yeast product to undergo a conditioning fermentation without substantial cell multiplication with aeration in a nutrient solution containing sugar and nutrient salts, the sugar in solution being in substantially the ratio of from 2 to 5%, and then separating the conditioned yeast from the solution.

2. The method of treating yeast subsequent to propagation for enabling it better to retain its baking properties, which comprises causing a yeast product to undergo a conditioning fermentation without substantial cell multiplication with aeration in a nutrient solution containing sugar and nutrient salts, including a compound adapted to supply yeast assimilable nitrogen, the sugar in solution being of substantially the ratio of from 2 to 5%, and then separating the conditioned yeast from the solution.

3. The method of treating yeast subsequent to propagation for enabling it better to retain its baking properties, which comprises causing a yeast product to undergo a conditioning fermentation without substantial cell multiplication with aeration in a nutrient solution containing sugar and nutrient salts, including compounds adapted to supply yeast assimilable phosphorous and nitrogen, the sugar in solution being in substantially the ratio of from 2 to 5%, and then separating the conditioned yeast from the solution.

4. The method of treating yeast subsequent to propagation for enabling it better to retain its baking properties, which comprises causing a yeast product to undergo a conditioning fermentation with aeration in a nutrient solution containing sugar and nutrient salts, including ammonium tartrate, which is adapted to supply during fermentation yeast assimilable nitrogen, and then separating the conditioned yeast from the solution.

5. The method of treating yeast subsequent to propagation for enabling it better to retain its baking properties, which comprises causing a yeast product to undergo a conditioning fermentation with aeration in a nutrient solution containing sugar and nutrient salts, including ammonium tartrate and calcium phosphate, to which is added a portion of free lactic acid, and subsequently separating the conditioned yeast from the solution.

6. The method of treating yeast subsequent to propagation for enabling it better to retain its baking properties, which comprises causing a yeast product to undergo a conditioning fermentation with aeration in a nutrient solution containing sugar and nutrient salts, causing the conditioned yeast to pass into a dormant state by lowering its temperature for a period sufficient to suspend the normal activity of the yeast, thereafter restoring the yeast to normal temperature, mixing absorbent material with the yeast, and desiccating the resultant mass.

7. The method of treating yeast subsequent to propagation for enabling it better to retain its baking properties, which comprises causing a yeast product to undergo a conditioning fermentation with aeration in a nutrient solution containing sugar and nutrient salts, causing the conditioned yeast to pass into a dormant state by lowering its temperature for a period sufficient to suspend the normal activity of the yeast, thereafter restoring the yeast to normal temperature, mixing absorbent material with the yeast, mixing oil with the desiccated mass until a homogeneous mixture results, and finally desiccating the mixture.

8. The method of treating yeast subsequent to propagation for enabling it better to retain its baking properties, which comprises causing a yeast product to undergo a conditioning fermentation with aeration in a nutrient solution containing sugar and nutrient salts, causing the conditioned yeast to pass into a dormant state by lowering its temperature for a period sufficient to suspend the normal activity of the yeast, thereafter restoring the yeast to normal temperature, mixing absorbent material with the yeast, thereafter filming the yeast particles with oil and sufficient water to make a pasty mass, and finally desiccating the pasty mass.

9. The method of treating yeast subsequent to propagation for enabling it better to retain its baking properties, which comprises causing a yeast product to undergo a conditioning fermentation with aeration in a nutrient solution containing sugar and nutrient salts, causing the conditioned yeast to pass into a dormant state by lowering its temperature to a point at least as low as 0° C. for a period of time sufficient to suspend the normal activity of the yeast, thereafter thawing the yeast to restore it to normal temperature, mixing corn-meal with the yeast to absorb the exuded moisture, and desiccating the resultant mass.

10. The method of treating yeast subsequent to propagation for enabling it better to retain its baking properties, which comprises causing a yeast product to undergo a conditioning fermentation with aeration in a nutrient solution containing sugar and nutrient salts, causing the conditioned yeast to pass into a dormant state by lowering its temperature to a point at least as low as 0° C. for a period of time sufficient to suspend the normal activity of the yeast, thereafter thawing the yeast to restore it to normal temperature, mixing corn-meal with the yeast to absorb the exuded moisture, desiccating the resultant mass, filming the yeast particles with refined mineral oil and sufficient water to make a pasty mass, and finally desiccating the pasty mass.

11. The steps of a method of treating yeast subsequent to propagation which comprise causing yeast to pass into a dormant state by lowering its temperature for a period sufficient to suspend the normal activity of the yeast, thereafter restoring the yeast to normal temperature, and mixing absorbent material with the yeast.

12. The steps of a method of treating yeast subsequent to propagation which comprise causing yeast to pass into a dormant state by lowering its temperature to −4° C. for a period of time sufficient to suspend the normal activity of the yeast, thereafter restoring the yeast to normal temperature, mixing absorbent material with the yeast, and then desiccating the resultant mass.

13. The steps of a method of treating yeast subsequent to propagation which comprise causing yeast to pass into a dormant state by lowering its temperature for a period sufficient to suspend the normal activity of the yeast, thereafter restoring the yeast to normal temperature, mixing absorbent material with the yeast, mixing mineral oil with the resultant mass until a homogeneous mixture results, and finally desiccating the mixture.

14. The steps of a method of treating yeast subsequent to propagation which comprise causing yeast to pass into a dormant state by lowering its temperature to —4° C. for a period of time sufficient to suspend the normal activity of the yeast, thereafter thawing the yeast to restore it to normal activity, mixing corn-meal with the yeast, filming the yeast particles with a refined mineral oil and sufficient water to make a pasty mass, and finally desiccating the pasty mass.

In testimony whereof, we affix our signatures.

FRANK M. HILDEBRANDT.
CHARLES N. FREY.